A. HANPETER.
EXTRA TIRE CARRIER.
APPLICATION FILED OCT. 11, 1916.
1,240,340.
Patented Sept. 18, 1917.
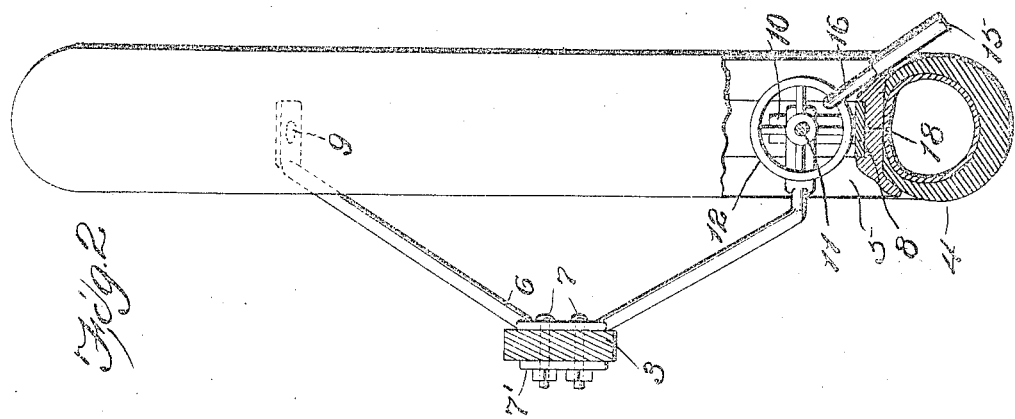
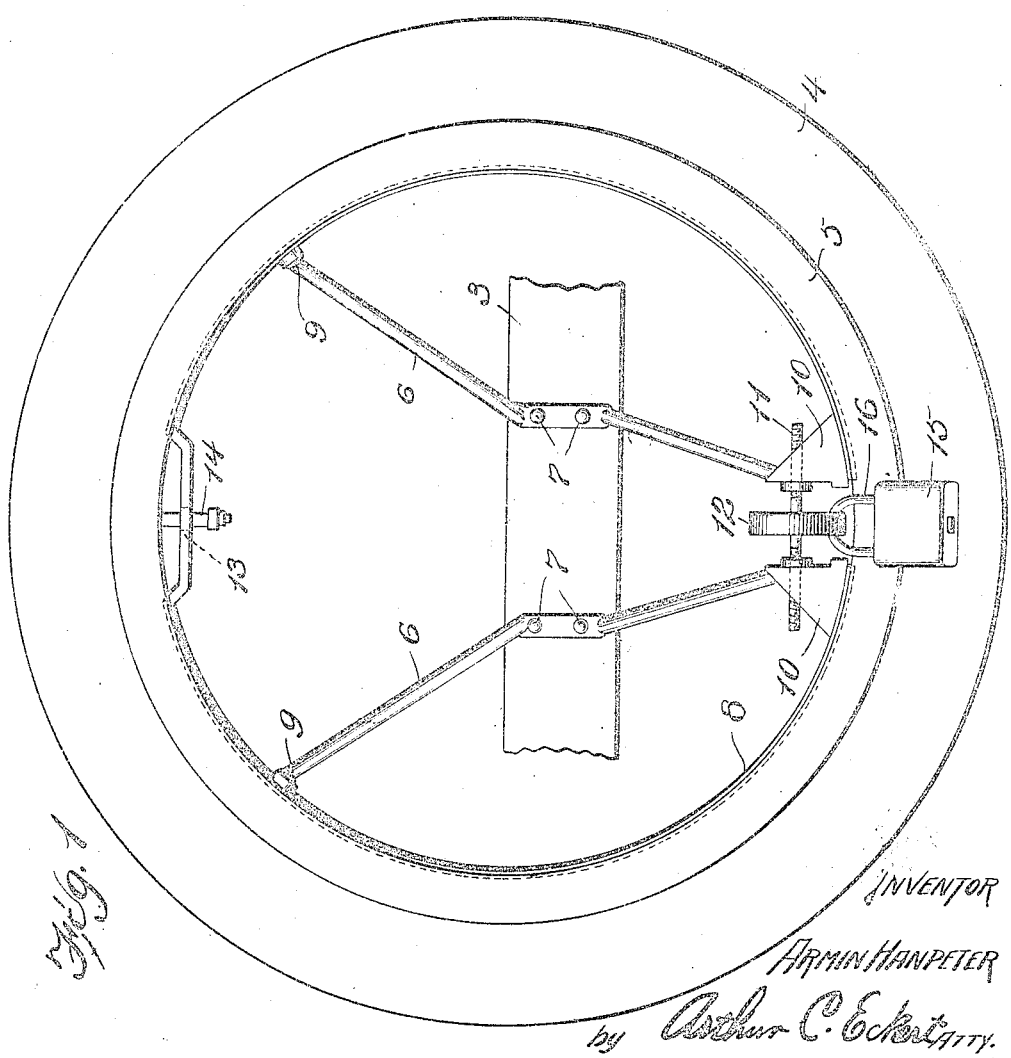
INVENTOR
ARMIN HANPETER
by Arthur C. Eckert ATTY.

UNITED STATES PATENT OFFICE.

ARMIN HANPETER, OF ST. LOUIS, MISSOURI.

EXTRA-TIRE CARRIER.

1,240,340.　　　　　Specification of Letters Patent.　　Patented Sept. 18, 1917.

Application filed October 11, 1916. Serial No. 125,021.

*To all whom it may concern:*

Be it known that I, ARMIN HANPETER, a citizen of the United States, and resident of St. Louis, Missouri, have invented certain new and useful Improvements in Extra-Tire Carriers, of which the following is a specification containing a full, clear, and exact description, reference being had to the accompanying drawings, forming a part hereof.

My invention relates to improvements in "extra tire carriers."

The object of my invention is to provide a simple, compact carrier for extra or spare tires and rims to be used on vehicles especially automobiles; to provide such a device that will be lighter in weight, cheaper in construction and one that will permit of a quick replacement of tires; that will securely hold the tire in position without placing the tire in contact with straps or other means of attachment, as well as lock the tire to the holder.

A tire carrier must, to be practical, securely hold the tire in position, prevent its removal except when unlocked, and be quickly detachable when the occasion requires, with a minimum of effort and skill and the tire must be spaced apart from the vehicle and not be in contact with a strap, etc., for the reason that rubber deteriorates when in such contact through rubbing if any movement is possible between the tire and the securing means.

My carrier, it is believed, fulfils these requirements.

With the above purposes in view, my invention consists in certain novel features of construction, and arrangement of parts as will be hereinafter more fully described, pointed out in the claim and illustrated by the acompanying drawings, in which, Figure 1 is an elevation of my device, showing a tire secured to the holder and, Fig. 2 is an edge elevation, partly in section of my device, showing a tire secured to the holder.

Referring by numerals to the accompanying drawings:

3 designates an external portion of a vehicle to which the tire 4 and the rim 5 are to be detachably securable.

The tire 4 and the rim 5 are secured together by the conventional means.

Numerals 6 designate bent arms secured to the vehicle portion 3 by means of the bolts 7 and the plate 7'. Any other means of permanently securing the bent arms 6 to the vehicle portion 3 may be used. The bent arms 6 are of such conformation that when secured to the vehicle the free ends are spaced apart from the vehicle portion and lie in the same geometric plane. To the free ends of the bent arms 6 is permanently secured the expansible split band 8 by means of the bolts 9.

Each of the lugs 10 is firmly secured by bolts or other fastening means to one of the arms 6, and each of the lugs 10 is firmly secured by bolts or other fastening means to one of the ends on the inner surface of the split expansible band 8. On the inner periphery of the rim 5 is formed a channel 18. The cross section of the channel 18 and of the split expansible band 8 are substantially identical permitting the band 8 to be seated in channel 18 in sliding contact therewith.

Through the lugs 10, the shaft 11 is made to pass, being threaded into each lug by oppositely directioned threads. To the shaft 11 is keyed at its middle the spoked wheel 12, so that the wheel occupies the space between lugs 10, as shown in Fig. 1.

It will be seen that a turn of the wheel 12 will alter the distance between the lugs 10, hence alter the distance between the ends of the band 8 and thereby alter its diameter.

The numeral 13 designates a hole in the band 8 through which the valve stem 14 passes.

The band 8 is normally in such a position that the lugs 10 are juxtaposed which means that the band 8 has its minimum diameter. The band 8 is of such a length that when in a normal position, its diameter is slightly less than the diameter of the rim 5, and the distance between the lugs 10 is so proportioned, as well as the length of the rod 11, that when the lugs 10 are forced apart by the proper turn of wheel 12, the limiting diameter, is slightly greater than the diameter of the channel 18.

The numeral 15 indicates a conventional pad lock suspended on the wheel 12 by means of its staple 16. Lock 15 is of such size that when positioned as shown in Fig. 1, it precludes an appreciable turn of the wheel 12 for the space between the lugs 10 is made so small as to prevent the lock 15 from passing between them. The operation of my extra tire carrier is as follows:—Assuming the band 8 in its normal position and that the lock 15 is removed and that it is desired to attach the tire 5 together with its rim, to the vehicle; the manipulator places the tire and rim on the band 8, first inserting the valve stem 14 into the hole 13 and then positioning the tire and rim into the plane of the band until the band 8 rests in the channel 18; owing to the difference in diameter between the band 8 and the rim 5, this can be easily accomplished.

The wheel 12 is now rotated so as to increase the distance between the lugs 10 and hence expand band 8 into channel 18. By means of friction between the band 8 and the channel 18 the tire will be prevented from slipping peripherally and will be prevented from lateral disengagement by the flanges that partially form the channel 18. By now inserting the lock 15 into the wheel 12, the object is attained. Removal of the tire means but a reversal of the order of the *modus operandi* herein indicated.

The operation occasions a very limited handling of the tire, a desirable feature since the placing of a muddy tire in the carrier always soils the operator's hands.

I have described my preferred form of construction but do not wish to be limited to its detail structure. What I claim and mean to secure by Letters Patent is, In combination with a tire rim, having a peripheral tire retaining flange, a channel on its inner face, and a hole extending from face to face of said rim for the reception of a valve stem, and to prevent circumferential movement of a tire on said tire rim, a split expansible circular element of such length as to prevent an overlapping of the ends in all positions, having a hole therethrough to provide an opening for the valve stem of a tire to extend therethrough and to prevent rotative movement of said tire rim and said split expansible circular element, two lugs, one secured to each end of said circular element, a right and left threaded bolt passing through said lugs, so that the distance between said lugs may be varied by a rotation of said bolt, a wheel secured at the center of said bolt, and locking means for securing said wheel in a predetermined position, said means consisting of a staple lock selectively positioned with the staple between the spokes of said wheel, said locking means greater in size than the volume between said lugs.

In testimony whereof, I have signed my name to this specification, in presence of two subscribing witnesses.

ARMIN HANPETER.

Witnesses:
HAZEL MUELLER,
BENJAMIN WOLF.